Figure 3:
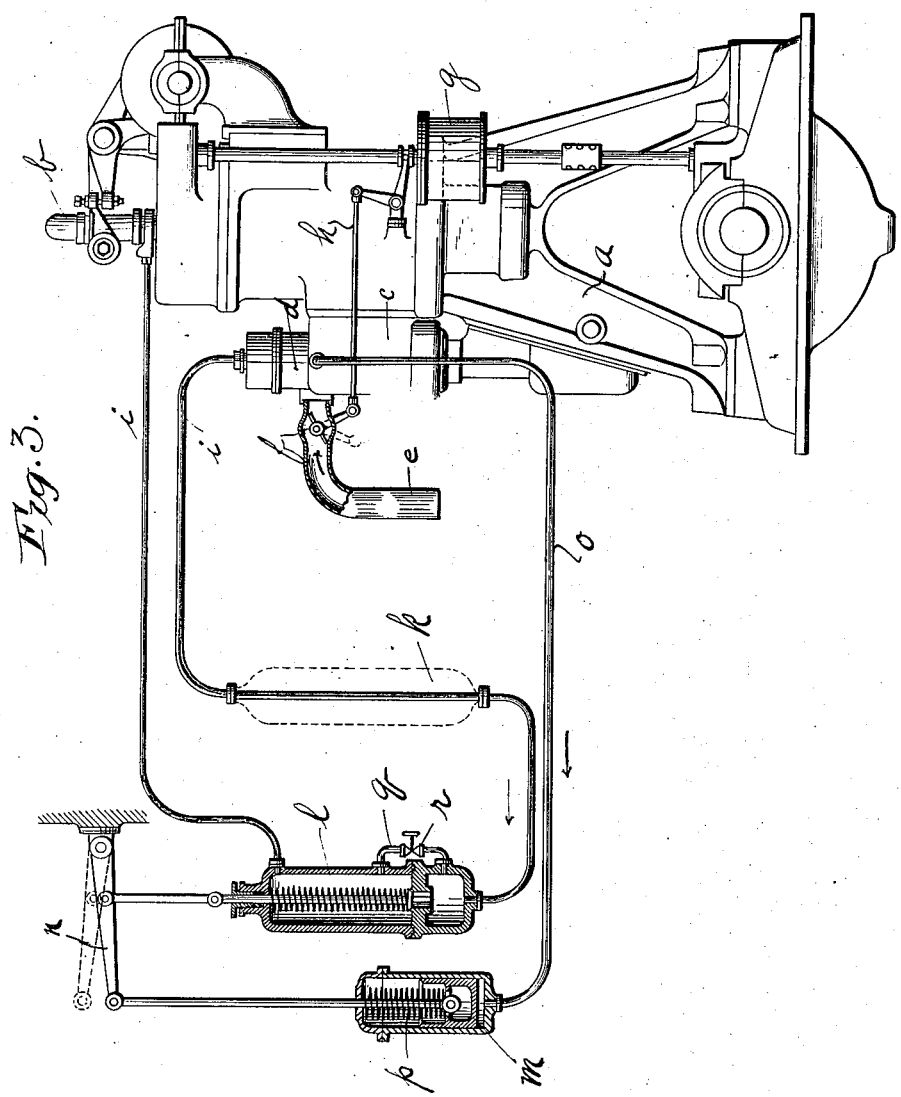

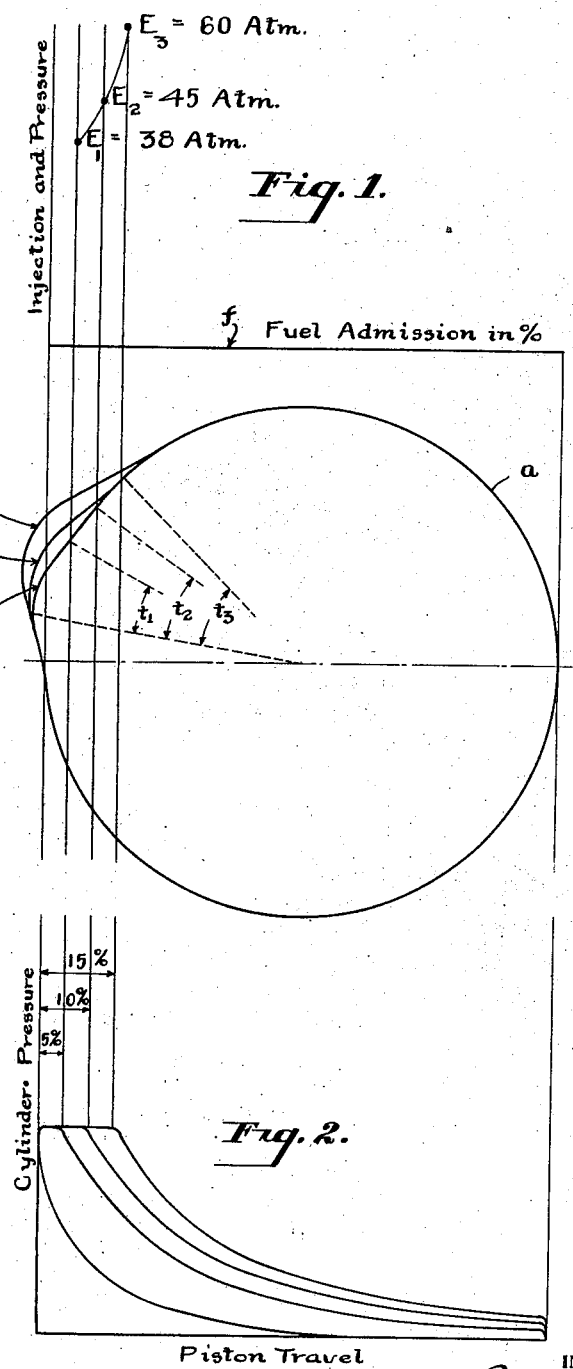

P. G. ROESTI.
METHOD OF REGULATING COMBUSTION ENGINES.
APPLICATION FILED JUNE 6, 1912.

1,166,938.

Patented Jan. 4, 1916.
2 SHEETS—SHEET 2.

WITNESSES

INVENTOR
Paul G. Roesti
BY
ATTORNEY

UNITED STATES PATENT OFFICE.

PAUL G. ROESTI, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

METHOD OF REGULATING COMBUSTION-ENGINES.

1,166,938.  Specification of Letters Patent.  Patented Jan. 4, 1916.

Application filed June 6, 1912. Serial No. 701,994.

*To all whom it may concern:*

Be it known that I, PAUL G. ROESTI, a citizen of the Republic of Switzerland, residing at Winterthur, Canton of Zurich, Switzerland, have invented the following-described Improvements in Methods of Regulating Combustion-Engines.

The invention seeks to improve the combustion and general efficiency of certain types of combustion engines which are required to operate under widely varying and quickly changing load conditions, and consists in an improved method of controlling the admission of fuel, as will be hereinafter fully set forth.

The invention refers to Diesel-type engines wherein the fuel is injected in atomized form by means of highly compressed air into a body of air or gas previously compressed in the engine cylinder to a temperature sufficient to ignite it, the fuel being admitted during a part of the working stroke. Heretofore compensation for load variations in such engines has been made in part and chiefly by means of corresponding regulation of the fuel supplied for each stroke.

The present invention consists in a new method of accomplishing more effective regulation and compensation for load variations by simultaneously controlling both the duration of the fuel admission period and the pressure of air by which the fuel is injected against the cylinder compression. Such method may be employed in conjunction with the customary regulation of the fuel at the pump, and results in a material economy of power and an absence of smoke in the exhaust under all conditions of engine operation.

In the accompanying drawings, Figure 1 is a diagram representing the relationship of the two controls, *i. e.*, the control of the duration of fuel admission, and of the tension of the injection air; Fig. 2 represents the combustion card in relation to such diagrammatic control. Fig. 3 is a view, partly in elevation and partly in section, of apparatus for carrying out the method, the illustration being somewhat schematic.

In Fig. 1 the circle $a$ represents the piston stroke, and the curves $b$, $c$ and $d$ indicate the open periods of the fuel valve of the engine for different degrees of load as represented by $t'$, $t^2$ and $t^3$. The amount of valve lift of the fuel valve, also represented by these curves, may be variable or constant, as preferred, provided, of course, the cross-section of the valve opening is adequately designed. Corresponding to the graded duration of fuel admission the points $E_1$, $E_2$ and $E_3$ represent the corresponding pressures of the fuel injection air, a pressure of, say, 38 atmospheres being employed for the lighter load (curve $b$), 45 atmospheres for the intermediate load (curve $c$) and 60 atmospheres for the heaviest load (curve $d$) as plainly indicated on the diagram and shown by the legends thereon. For average load conditions the variation of the injection air pressure may be made in direct proportion to the simultaneous variation of the duration of fuel admission, but above or below the range of what may be regarded as average load fluctuations, the change in the air pressure should take place in an increasing proportion relatively to that of the admission period. But such variation of the air pressure, as I have ascertained, must also be confined within certain definite outside limits above or beyond which only the period of fuel admission should be further varied. Thus starting with the engine running at an average load, and upon a decrease thereof, fuel admission and injection air pressure are simultaneously diminished and in direct proportion, down to the point which is taken for the lowest ordinary load beyond which the air pressure must be diminished more rapidly than the fuel admission until the point of relatively light load is reached, beyond which the air pressure must remain constant while the fuel admission period may be further shortened until the load becomes zero. The same regulation takes place in the reverse sense with an increasing load. The particular duration of fuel admission and the corresponding air tension for different load conditions, as well as the limits above referred to, are best determined empirically in the manner that will be well understood, and when once determined can thereafter be arranged to be established automatically by means of any suitable form of gearing.

The control of the injection air pressure, for instance, may be produced by means of a multiple-way valve interposed between the engine fuel valve and a battery of air tanks or other sources of injection air of graded pressures, such valve being adapted to connect any one of these sources with the fuel valve for the purpose of injecting the fuel. The handle of such valve may be actuated by or in conjunction with the control of the fuel admission controlling apparatus, whereby when it reaches its predetermined limit of movement, representing the limit of change of injection air pressure, the latter may be further moved to still further increase or decrease the duration of the admission period. Conveniently a single control member will operate both or all of the regulating devices of the engine, and such member may be operated by hand or by means of a governor or indirectly by some organ which is regulated in conformity with the load on the engine, as, for instance, by the pressure condition in the injection air pump, the latter in such case being directly controlled.

It will be observed that the new method requires that the variation of the injection pressure and the valve motion be simultaneous, which fact reduces to the minimum the possibility of failure or accidental disturbance of regulation of the engine, by the failure of one of the controlling factors, inasmuch as such disturbance will be lessened by the continuing action of the other members. It will also be observed that the invention provides for the most favorable use of air pressure and permits the employment of different kinds of fuel for different loads, affording facilities for the proper injection pressure for each grade of fuel.

Fig. 2 shows for instance one arrangement of the subject of invention. In the drawing $a$ represents a "Diesel engine," $b$ its fuel valve through which the fuel is injected by means of highly compressed air. The injecting air is supplied by a two-stage compressor $c$, $d$, $c$ being the low and $d$ the high pressure stage. The air suction pipe $e$ is fitted with a valve $f$ which may be operated either by hand or by means of a governor. The position of this valve is thus according to the output of engine. In the accompanying drawing valve $f$ is shown to be connected to a governor $g$ by gear $h$. This injection air passes from the high pressure air pump through pipe $i$ over to the fuel valve $b$. The time of keeping this valve $b$ open depends on the load on the engine, the result being variable duration of admission. The same effect can be obtained by different means, for instance like in steam engines. For this reason no special arrangement of said gear has been shown. The motion for this gear can be derived from the governor. It is desirable to fit the high pressure pipe $i$ with means for cooling the air and add a receiver of sufficient capacity as shown by dotted lines. An automatically working apparatus is provided in high pressure pipe $i$ for directly regulating the pressure. This latter consists of a regulating element $l$, which varies, according to its position, the flow of the high pressure air toward the fuel valve and also the pressure of the injection air. The automatic regulation of this throttle valve is performed by the piston $m$, the motion of which is transmitted to the throttle mechanism $l$ by the linkage $n$. The piston $m$ is put under air pressure through the pipe $o$ and takes its position accordingly. By the pressure in $o$, which varies with the output of the engine, acting in opposition to the pressure of the spring $p$, the piston $m$ is held in certain positions and with this the mechanism $l$. The pipe $o$ is connected somewhere to the suction pipe or to any other pipe between two stages of the injection air pump. In our drawing it is shown connected to the discharge pipe of the first stage $c$. The connection could for instance also be made to the suction pipe $e$, on condition however that it joins between the regulating valve $f$ and low pressure pump itself, the reasons of which are obvious.

This improved regulating device acts as follows: Supposing an alteration of the horse power output of the machine occurs. The regulator $g$ will change its position forthwith operating thereby also the gear of the fuel valve of the fuel pump and of the valve $f$ in the suction air pipe. The quantity of air sucked in by the pump as well as the suction pressure will adjust themselves automatically to a certain value, with the result that a change of pressure in the discharge pipes of the different air pump stages $c$ and $d$ will take place. As there are receivers and intercoolers, etc., between the different compressor stages, some time will elapse before a pressure in the fuel valve and in the pipe $i$, leading to same, is obtained, which corresponds to the position of mechanism $f$. In order to perform an alteration of pressure in the air injection pipe $i$ more quickly, as well as in the fuel valve $b$ itself, the throttle mechanism $l$ is provided, which is adjusted by the piston $m$, the latter being dependent on the air pressure of the low pressure stage and operated by same. According to the various positions of valve $f$, the pressure in the low pressure stage $c$ changes relatively quick, whereby a quick alteration of pressure occurs in the high pressure pipe $i$. The effect of organ $l$ can be increased by inserting same between vessel $k$ and fuel valve $b$, but not between vessel $k$ and high pressure stage $d$ of the injection air compressor, for then only the pressure of a relatively small volume of the pipe $i$ has to be changed. In order to insure the passage of a certain quantity of injection air for a given load, or for instance for no load at all, a by-pass pipe $q$ may be fitted to the regulation organ $l$, always allowing the passage a minimum quantity of air. The adjustment of this said flow of air can, if for instance conditions of load are changed, be varied and can be determined by a regulating organ $r$. Any other organ, as for instance, a membrane, may be used instead of piston $m$. On multi-cylinder engines each cylinder or group thereof or all cylinders together may be fitted with such a regulating arrangement.

I claim—

1. A method of operating internal combustion engines which comprises introducing air or gas into the engine cylinder, compressing the same therein, injecting fuel by means of air under pressure into the body of air or gas previously compressed in the cylinder, and compensating for load variations by simultaneously and similarly varying the duration of the period of fuel injection and the tension of the fuel injection air.

2. A method of operating internal combustion engines which comprises introducing air or gas into the engine cylinder, compressing the same therein, injecting fuel by means of air under pressure into the body of air or gas previously compressed in the cylinder, and compensating for load variations by simultaneously and similarly varying the duration of the period of fuel injection and the tension of the fuel injection air within certain limits and above or below such limits varying the duration of the period of fuel injection only.

In testimony whereof, I have signed this specification in the presence of two witnesses.

PAUL G. ROESTI.

Witnesses.
 AUGUST RUEGG,
 HARRY A. MCBRIDE.